United States Patent [19]
Hilton et al.

[11] Patent Number: 5,303,360
[45] Date of Patent: Apr. 12, 1994

[54] PROGRAMMABLE BOUNDARY BETWEEN SYSTEM BOARD MEMORY AND SLOT BUS MEMORY

[75] Inventors: William K. Hilton, Phoenix; Charles R. Rimpo, Mesa, both of Ariz.

[73] Assignee: VLSI Technology, Inc., San Jose, Calif.

[21] Appl. No.: 659,588

[22] Filed: Feb. 22, 1991

[51] Int. Cl.$^5$ ............................................. G06F 13/00
[52] U.S. Cl. ........................ 395/425; 364/DIG. 1; 364/DIG. 2; 365/189.01; 365/230.02; 365/230.06; 395/400
[58] Field of Search ............... 395/425, 400; 364/200 MS File, 900 MS File, 969.1, 970.5; 365/230.06, 189.01, 230.02

[56] References Cited

U.S. PATENT DOCUMENTS

| | | | |
|---|---|---|---|
| 3,725,868 | 4/1973 | Malmer, Jr. et al. | 364/200 |
| 3,914,747 | 10/1975 | Barnes et al. | 364/200 |
| 4,096,571 | 6/1978 | Vander May | 364/200 |
| 4,675,808 | 6/1987 | Grinn et al. | 364/200 |
| 4,779,191 | 10/1988 | Greenblatt | 364/200 |
| 4,796,232 | 1/1989 | House | 365/189 |
| 4,837,738 | 6/1989 | Lemay et al. | 364/900 |
| 4,849,875 | 7/1989 | Fairman et al. | 364/200 |
| 4,894,770 | 1/1990 | Ward et al. | 364/200 |
| 4,926,314 | 5/1990 | Dhuey | 364/200 |
| 4,969,086 | 11/1990 | Pfeiffer et al. | 364/200 |
| 4,985,871 | 1/1991 | Catlin | 365/230.06 |
| 5,093,909 | 3/1992 | Saito | 395/400 |

Primary Examiner—Joseph L. Dixon
Assistant Examiner—B. James Peikari
Attorney, Agent, or Firm—Harry M. Weiss

[57] ABSTRACT

Apparatus for providing a boundary between on-board CPU memory and slot bus (EMS) memory is disclosed. A programmable comparator compares the CPU address with a pre-determined address in order to permit the memory array to be accessed by the CPU address or the EMS register, thus preventing the same memory array from being accessed by both the CPU address and the EMS register.

12 Claims, 1 Drawing Sheet

PROGRAMMABLE BOUNDARY BETWEEN SYSTEM BOARD MEMORY AND SLOT BUS MEMORY

TECHNICAL FIELD

The present invention relates, in general, to a memory access scheme and, more particularly, to a memory access scheme where a block of memory can be reserved for access by the expanded memory specification registers.

BACKGROUND ART

When microcomputers were introduced, as little as 16 Kbytes of memory resided in the central processing units. Eventually, a fully expanded 8-bit processor offered 64 Kbytes of addressable memory, which was very adequate for users needs. The subsequent development of personal computers resulted in computers having typically ten times the system memory of the foregoing microcomputers and employing a powerful disk operating system (DOS) which was quickly recognized as the standard of the industry. One of the basic limitations of DOS is that it operates within the 1 megabyte limit with no capability for utilizing memory beyond this limit. In order to solve the problems associated with this memory limitation, expanded memory specification (EMS) was developed. The 1 megabyte address space was divided into random access memory from 0 to 640 Kbytes leaving 384 Kbytes of memory remaining. This 384 Kbyte portion of memory was divided into six equal portions of 64 Kbytes of memory each referred to as A, B, C, D, E and F for their hexadecimal representations. These portions of memory are typically used for various purposes. For example, portions E and F are reserved for BIOS ROM memory, while video adapters and other interface adapters are placed into other portions. Expanded memory specification (EMS) utilizes three of these portions, i.e., portions C, D, and E. Basically, EMS translates an address below 1 Mbyte into memory above 1 Mbyte, thus bypassing the foregoing DOS limitation In memory arrays, it is possible that a portion of the array can be accessed by both CPU addresses and the expanded memory specification (EMS) registers. In such a case, because the same memory space can be accessed by both CPU addresses and EMS registers, data integrity is difficult to maintain. Typically, this problem of joint accessibility is eliminated through various software techniques. These techniques, however, may not provide the data integrity, reliability and ease of use desired. Because of this, it has become desirable to develop hardware which inhibits access to portions of memory by both CPU addresses and the EMS registers simultaneously.

SUMMARY OF THE INVENTION

The present invention solves the problems associated with the prior art approaches and other problems by providing hardware that prevents simultaneous access to the same portion of memory by both the CPU addresses and the EMS registers. A programmable 10-bit comparator is utilized to compare the CPU address to a pre-determined address, known as a slot pointer address. If the CPU address is below the slot pointer address and is not to an EMS register, the CPU bankselect passes through to the memory array. If the CPU address is to a valid EMS register, the CPU bankselect is inhibited and the EMS bankselect is passed through to the memory array and this operation is completely independent of the slot pointer address. Finally, if the CPU address is equal to or greater than the slot pointer address and no EMS access is present, then no bankselect is passed through to the memory array. So memory access above the slot pointer address is accomplished indirectly by programming the desired memory address location into an EMS register and subsequently accessing this EMS register thus providing greater data integrity, increased reliability and ease of use.

BRIEF DESCRIPTION OF THE DRAWINGS

The single FIGURE of the drawings is a diagram of the logic utilized by the present invention.

DESCRIPTION OF THE PREFERRED EMBODIMENT

Figure 1:
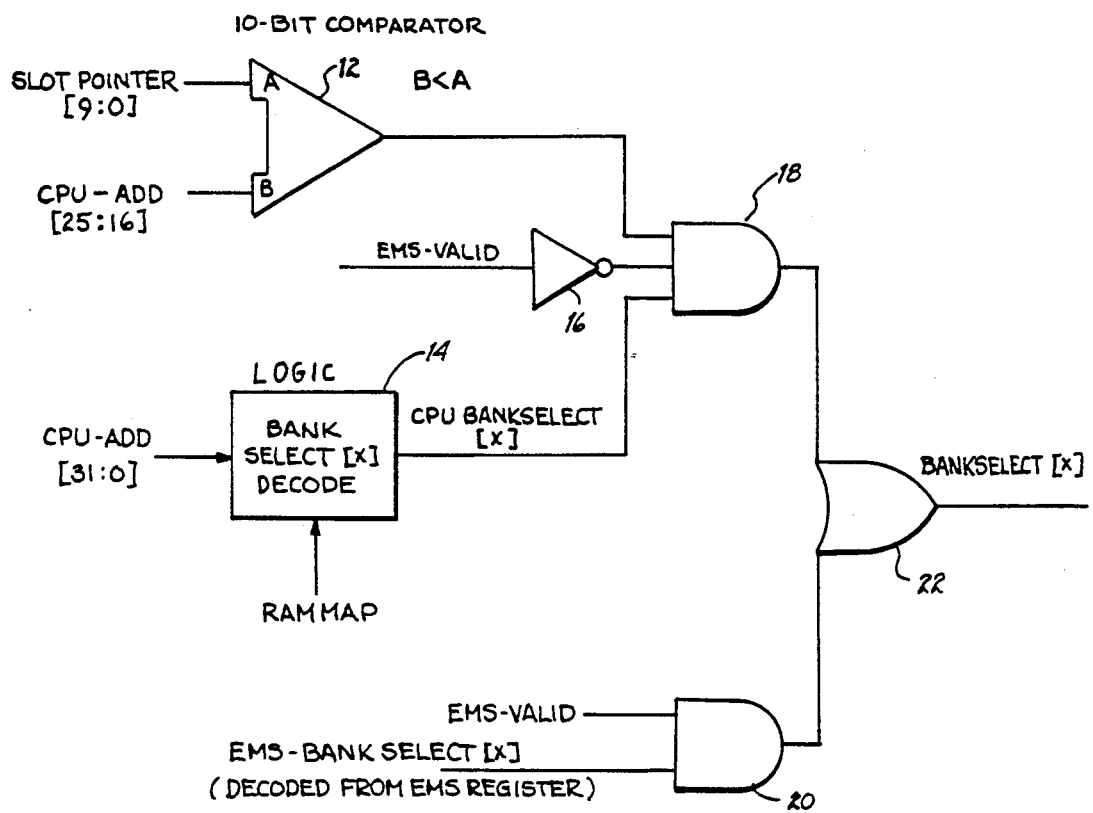

Referring now to the single FIGURE of the drawing, this FIGURE depicts the logic utilized by the present invention. The upper portion of this logic diagram is comprised of a comparator 12, bank select decode logic 14, and an inverter 16, all of whose outputs are connected to the inputs to an AND gate 18. The lower portion of the logic diagram is comprised of an AND gate 20 whose inputs are connected to an expanded memory specification register and to a bank select decoder associated with the expanded memory specification register. The outputs of the AND gates 18 and 20 are connected to the inputs to an OR gate 22 whose output is connected to banks of dynamic random access memories (DRAMs) (not shown).

The comparator 12 is a programmable ten-bit comparator whose inputs are connected to CPU addresses and to a pre-determined address, shown as a slot pointer address. Assuming that the desired slot pointer address has been established as address line [9:0] (input A of the ten-bit comparator), and that the CPU address, shown as address line [25:16] (input B of the comparator), is less than the foregoing slot pointer address, and further assuming that no EMS access is present, then the CPU address bankselect decode signal is allowed to pass through gates 18 and 22 to the memory array. If, however, EMS access is present, inverter 16 inhibits AND gate 18, and the EMS bankselect signal is allowed to pass through gates 20 and 22 of the memory array. This latter operation is completely independent of the slot pointer address. Finally, if EMS access is not present and the CPU address line [25:16] is greater than or equal to the slot pointer address line [9:0], both bankselects are inhibited and memory access above the slot pointer address is gained indirectly by programming the desired memory address location into an EMS register and then accessing this EMS register. Thus, direct CPU access to the memory space above the slot pointer address but below the top of the currently selected RAM map is inhibited and can only be accessed by programming the desired memory address location into an EMS register and then subsequently accessing this EMS register. In this manner, data integrity is effectively maintained.

It should be noted that the slot pointer has no effect on CPU addresses between 0 and 256 Kbytes. That is, programming the slot pointer from 0000 0000h to 0003 FFFh does not inhibit bankselects for CPU addresses below 256 Kbytes. Since the operating system is usually stored in this memory space, if the slot pointer is not ignored in this range, this system would "lock up" if programming a slot pointer to this range inadvertently occurred. Setting the slot pointer to addresses in the 256 Kbyte to 640 Kbyte range is permitted but expanded memory specification (EMS) operation in the 24 EMS backfill registers in this range is inhibited. If the slot pointer is set in the 640 Kbyte to 1024 Kbyte range, the logic response is as if 1 Mbyte was loaded into the slot pointer register. Because of this, the typical approach to using the slot pointer is to load it with a value between 1 Mbyte and the top of the currently selected memory map option in order to allocate a portion of random access memory (RAM) for access by the expanded memory specification (EMS) slot bus only.

As an example, consider a memory option with 4 Mbytes of DRAM and a program with two large data blocks that are accessed frequently. It is desirable to place the data blocks in RAM so they may be accessed quickly. Assume that one block of data will start at the 2 Mbyte boundary (address 20 0000h), the second data block at the 3 Mbyte boundary (address 30 0000h). The currently utilized system will require that its 72 EMS registers be loaded in the following manner:

| Operation | Data | Address | Remarks |
| --- | --- | --- | --- |
| I/O write | 40h | E8h | Select standard register set, auto-increment starting at [CO] page segment. |
| I/O write | 80h | EBh | [CO] will point to 2 Mbyte boundary. |
| I/O write | 81h | EBh | [C4] points to 2 Mbyte plus 16 Kbyte. |
| <Repeat for 36 Registers> | | | |
| I/O write | COh | E8h | Select alternate register set, start again at [CO]. |
| I/O write | COh | EBh | Points to 3 Mbyte boundary in alternate register set, [CO] page segment. |
| <Repeat for 36 Registers> | | | |
| I/O write | CFFFh | EDh | Enables all the EMS registers. |

Subsequently, an access to address OC OXXXh will be translated to 20 OXXXh where CPU address bit [13:2] passes through to the memory array and CPU address bits [25:14] select an EMS page segment such as [CO] which contains the "logical" address. Switching between the alternate and standard register sets requires an additional I/O write to address [F9h]. Each EMS register set points to 512 Kbyte of memory. If the data block is larger than 512 Kbyte, the EMS driver must write new target values into the EMS registers. In light of the foregoing, access to memory in the 2 to 3 Mbyte range is possible through the EMS translation and/or through direct access, which is clearly undesirable if data integrity is to be maintained. The present invention provides for a 64 Kbyte wide memory boundary which redefines the top of memory for a given memory array option. The slot pointer is loaded with CPU address bits [25:16] (input A in the single FIGURE of the drawings), which, in this example, would load the slot pointer with address O2Oh and inhibit RAM access above 2 Mbyte, thus maintaining data integrity and directing memory access above the currently defined slot pointer address location to the EMS slot bus while inhibiting direct access to the memory array.

In summary, the slot pointer of the present invention establishes a boundary between on-board CPU memory and slot bus (EMS) memory. The foregoing boundary is continuously compared to the current CPU address by the comparator 12, and the bankselect determinations are made in a 33 megahertz operating environment within a complex memory map structure while maintaining data integrity and providing for ease of use.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. Apparatus for allocating memory within a computer system to be accessible by both central processing unit addresses and expanded memory specification registers comprising 10-bit comparator means for comparing a central processing unit address with a predetermined address, said predetermined address having means for programming boundaries between said central processing unit addresses and said expanded memory specification registers, said comparing means causing a first signal to be transmitted to the memory if the central processing unit address is less than said pre-determined address and causing a signal to be transmitted to an expanded memory specification register if the central processing unit address is equal to or greater than said pre-determined address.

2. The apparatus as defined in claim 1 wherein said first signal is a central processing unit bankselect decode signal.

3. The apparatus as defined in claim 1 wherein said signal transmitted to the expanded memory specification register is a desired memory address location.

4. The apparatus as defined in claim 1 further including means responsive to the accessing of an expanded memory register by a central processing unit address.

5. Apparatus for allocating memory within a computer system to be accessible by both central processing unit addresses and expanded memory specification registers comprising means for comparing a central processing unit address with a predetermined address, said comparing means causing a first signal to be transmitted to the memory if the central processing unit address is less than said pre-determined address and causing a signal to be transmitted to an expanded memory specification register if the central processing unit address is equal to or greater than said pre-determined address, further including means responsive to the accessing of an expanded memory register by a central processing unit address, said accessing of an expanded memory register by a central processing unit address causes said responsive means to inhibit the operation of said comparing means preventing the transmission of said signals therefrom and permitting a second signal to be transmitted to the memory.

6. The apparatus as defined in claim 5 wherein said second signal is an expanded memory specification bank decode signal.

7. A method for allocating memory within a computer system to be accessible by both central processing unit addresses and expanded memory specification registers comprising the steps of: providing 10-bit comparator means for comparing a central processing unit address with a pre-determined address, said predetermined address having means for programming boundaries between said central processing unit addresses and said expanded memory specification registers, said comparing means causing a first signal to be transmitted to the memory if the central processing unit address is less than said predetermined address and causing a signal to be transmitted to an expanded memory specification register if the central processing unit address is equal to or greater than said pre-determined address.

8. The method as defined in claim 7 wherein said first signal is a central processing unit bankselect decode signal.

9. The method as defined in claim 7 wherein said signal transmitted to the expanded memory specification register is a desired memory address location.

10. The method as defined in claim 7 further including providing means responsive to the accessing of an expanded memory register by a central processing unit address.

11. A method for allocating memory within a computer system to be accessible by both central processing unit addresses and expanded memory specification registers comprising the steps of: providing means for comparing a central processing unit address with a pre-determined address, said comparing means causing a first signal to be transmitted to the memory if the central processing unit address is less than said predetermined address and causing a signal to be transmitted to an expanded memory specification register if the central processing unit address is equal to or greater than said pre-determined address, further including providing means responsive to the accessing of an expanding memory register by a central processing unit address, said accessing of an expanded memory register by a central processing unit address causes said responsive means to inhibit the operation of said comparing means preventing the transmission of said signals therefrom and permitting a second signal to be transmitted to the memory.

12. The method as defined in claim 11 wherein said second signal is an expanded memory specification bank decode signal.

* * * * *